H. CHRISTOFFERSEN.
CULTIVATOR ATTACHMENT.
APPLICATION FILED APR. 27, 1909.
949,218.
Patented Feb. 15, 1910.
2 SHEETS—SHEET 2.
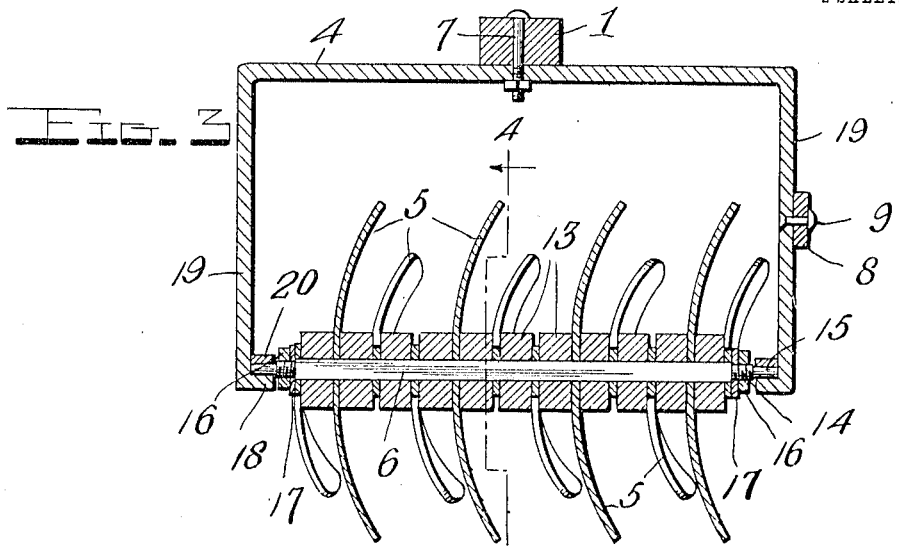
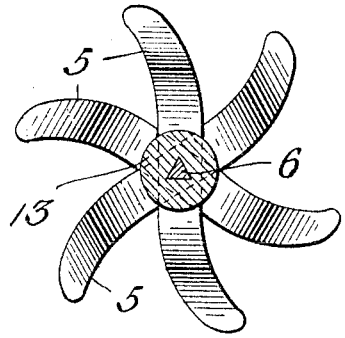
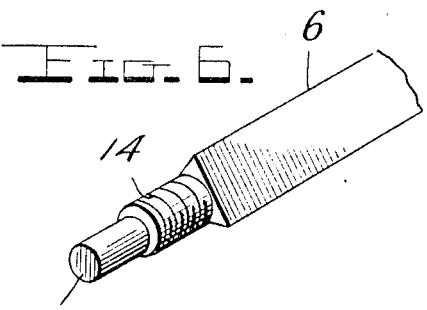
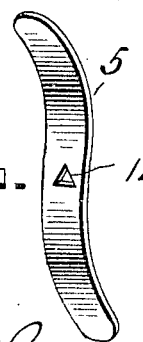
Witnesses
Chas. L. Griesbauer.
E. M. Rickette
Inventor
Hans Christoffersen
By Watson E. Coleman
Attorney

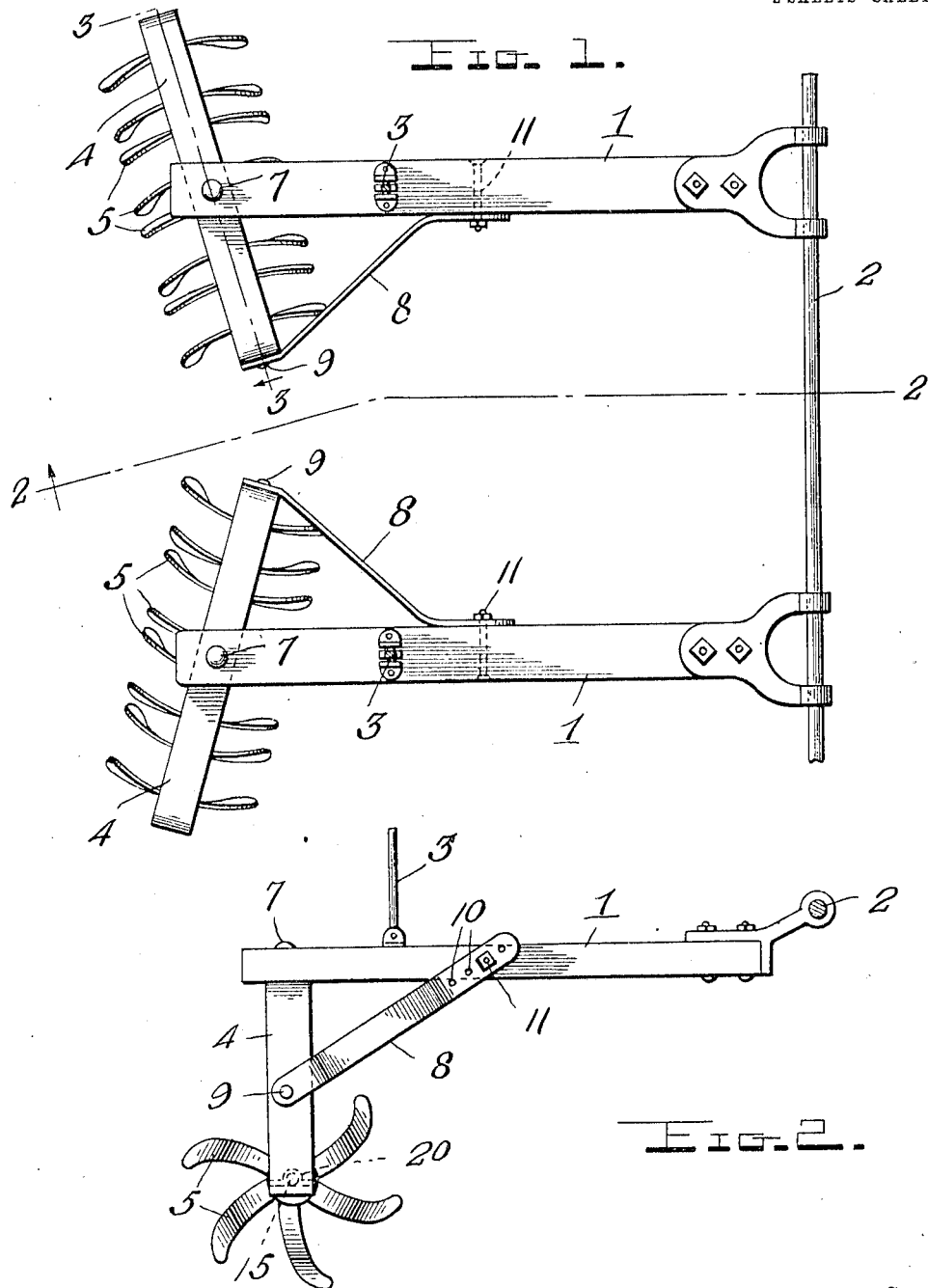

UNITED STATES PATENT OFFICE.

HANS CHRISTOFFERSEN, OF TILDEN, NEBRASKA.

CULTIVATOR ATTACHMENT.

949,218.  Specification of Letters Patent.  Patented Feb. 15, 1910.

Application filed April 27, 1909.  Serial No. 492,509.

*To all whom it may concern:*

Be it known that I, HANS CHRISTOFFERSEN, a citizen of the United States, residing at Tilden, in the county of Madison and State of Nebraska, have invented certain new and useful Improvements in Cultivator Attachments, of which the following is a specification, reference being had to the accompanying drawings.

This invention relates to improvements in attachments for cultivators and more particularly to improved rotary blade cultivating gangs which may be applied to and adjusted upon the beams of ordinary cultivators of either the single or double row type.

The object of the invention is to provide an improved cultivator gang device which will effectively cultivate the ground on the side of a row of corn or other plants and which will be lighter on the draft animals than the usual cultivator shovels and disks.

With the above and other objects in view, the invention consists of the novel features of construction and the combination and arrangement of parts hereinafter fully described and claimed, and illustrated in the accompanying drawings, in which—

Figure 1 is a plan view of a pair of my improved cultivator gangs showing them applied to the beams of a cultivator; Fig. 2 is a vertical section taken on the plane indicated by the line 2—2 in Fig. 1; Fig. 3 is a detail section taken on the plane indicated by the line 3—3 in Fig. 1; Fig. 4 is a section taken on the plane indicated by the line 4—4 in Fig. 3; Fig. 5 is a detail perspective view of one of the S-shaped blades; Fig. 6 is a perspective view of one end of the shaft shown in Fig. 3; and Fig. 7 is a similar view of a slightly different form of shaft.

Referring more particularly to the drawings, 1 denotes the beams of a cultivator of any form and construction, which beams are hung for vertical swinging movement from a part 2 of the main frame of the machine and adapted to be raised and lowered by links 3 connected to suitable lifting levers or by any other suitable devices. The beams 1 may be made of either wood or metal and hung as shown or in any other manner. These parts are old and well known and form no part of the present invention.

My invention is in the form of an attachment for use upon the beams 1 instead of ordinary cultivator shovels, disks or similar earth working devices; and it comprises a substantially U-shaped frame or hanger 4 containing a plurality or gang of rotary blades 5 which are curved longitudinally from end to end and have their ends curved in opposite directions as shown in Fig. 2. Said blades are fixed to rotary axles 6 journaled in the lower open portions of the frames or hangers 4 and are disposed at an angle to the line of draft to cause the blades 5 to properly operate upon the soil. Said U-shaped frames 4 are connected to the beams 1 by vertical pivots 7 arranged adjacent to the center of the closed top portions of the frames 4, whereby the latter may be swung angularly with respect to the beams 1 to vary the angle of the axle 6 with respect to the line of draft. The pivoted frames 4 are adapted to be retained in adjusted position by braces 8, the rear ends of which are pivoted at 9 to the inner side portions of the frames 4 and the forward ends of which are adjustably connected to the beams 1, preferably, by providing said ends with longitudinal series of openings 10 to receive transverse bolts or similar fastenings 11 arranged in said beams, as shown more clearly in Figs. 1 and 2 of the drawings.

The gangs consist of a plurality of the blades 5 each of which latter is formed from a single piece of suitable metal cut into proper shape, as shown more clearly in Figs. 4 and 5, and having its central portion formed with an opening 12 to receive the shaft 6 and its ends bent or curved longitudinally, as shown more clearly in Fig. 3. Said blades of each gang are fixed to the shaft 6 of the latter so that the adjacent blades will be out of alinement with each other, the preferred arrangement being effected by setting each of the blades one-third of the circumference ahead of the next adjacent blade. This may be effected by providing the shaft 6 with a body portion of triangular shape in cross section, as shown in Figs. 4 and 6, and forming the openings 12 in the blades of triangular shape; and then placing the blades on the shaft so that adjacent ones will be set at different angles, as will be readily understood. Another way of accomplishing the same result is by making the intermediate or body portion of the shaft 6 of hexagonal shape, as shown in Fig. 7, and, of course, making the openings in the blades of similar shape. The adjacent blades are spaced apart by spacing blocks or spools 13 which have central openings shaped to receive the flat faced intermediate portion of the shaft, as shown in Fig. 4. The ends of the shaft 6 are reduced to provide screw threaded portions 14 and they are further reduced to provide cylindrical extremities 15 which serve as journals for the shaft. The threaded portions 14 are provided for the reception of nuts 16 which together with washers 17 retain the blades 5 and blocks 13 upon the flat faced intermediate portion of the shaft. The reduced ends or journals 15 rotate in bearings formed by the inwardly bent extremities 18 of the downwardly projecting ends or arms 19 of the U-shaped frames 4 and said journals are removably retained in the bearings 18 by detachable bearing plates 20, as shown in Figs. 2 and 3.

Having thus described the invention what is claimed is:

The combination of a beam mounted for swinging movement, an inverted U-shaped frame having depending side portions and an upper connecting portion, and a vertical pivot uniting the upper connecting portion of said frame to said beam, bearings upon the depending side portions of said frame, a shaft having a flat faced intermediate portion, reduced screw portions adjacent its ends, and reduced cylindrical journals beyond said threaded portions and rotatable in said bearings, spacing blocks upon said shaft, curved blades having centrally arranged openings adapted to receive the flat faced portion of the shaft, said blades being arranged between the spacing blocks, and adjacent blades being disposed out of alinement with each other, nuts upon the threaded portions of said shaft, an adjusting brace connected at one end to one of the depending side portions of the frame and having its other end bent and formed with a longitudinal series of openings, and a bolt passed transversely through said beam and arranged in one of the apertures in the bent end of said brace for retaining said frame in adjusted position with respect to said beam.

In testimony whereof I hereunto affix my signature in the presence of two witnesses.

HANS CHRISTOFFERSEN.

Witnesses:
C. A. SMITH,
C. O. BAKER.